March 19, 1957  R. D. PUSEY  2,785,545
BULK MILK COOLER
Filed Sept. 24, 1954  3 Sheets-Sheet 1
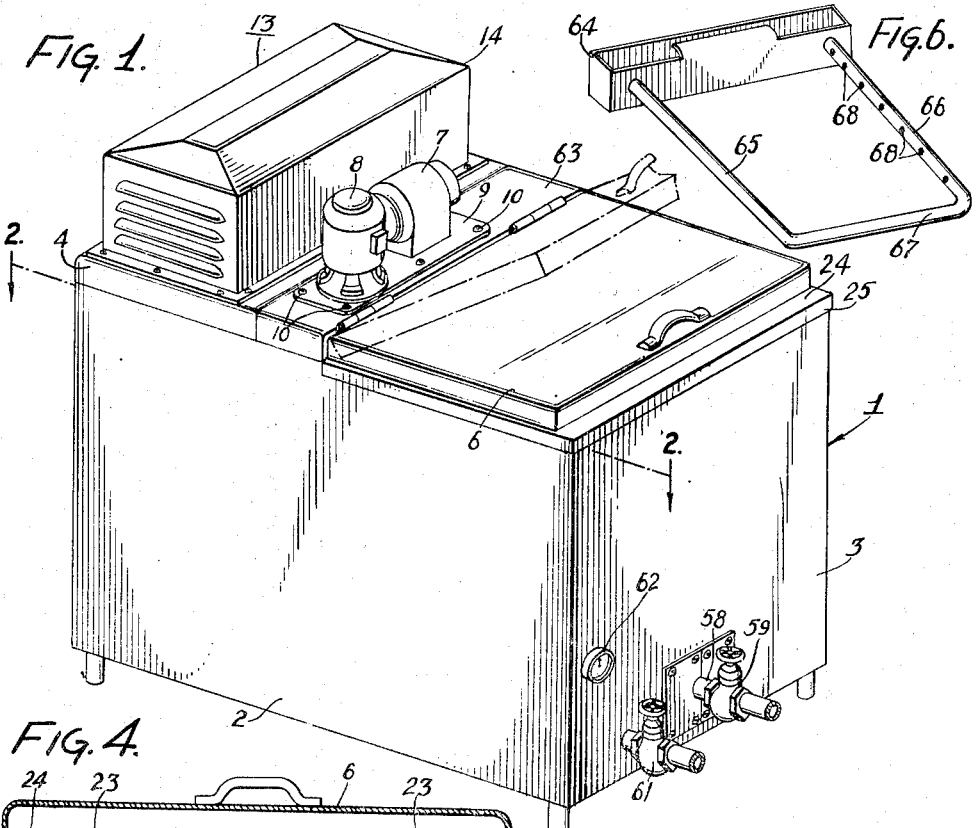
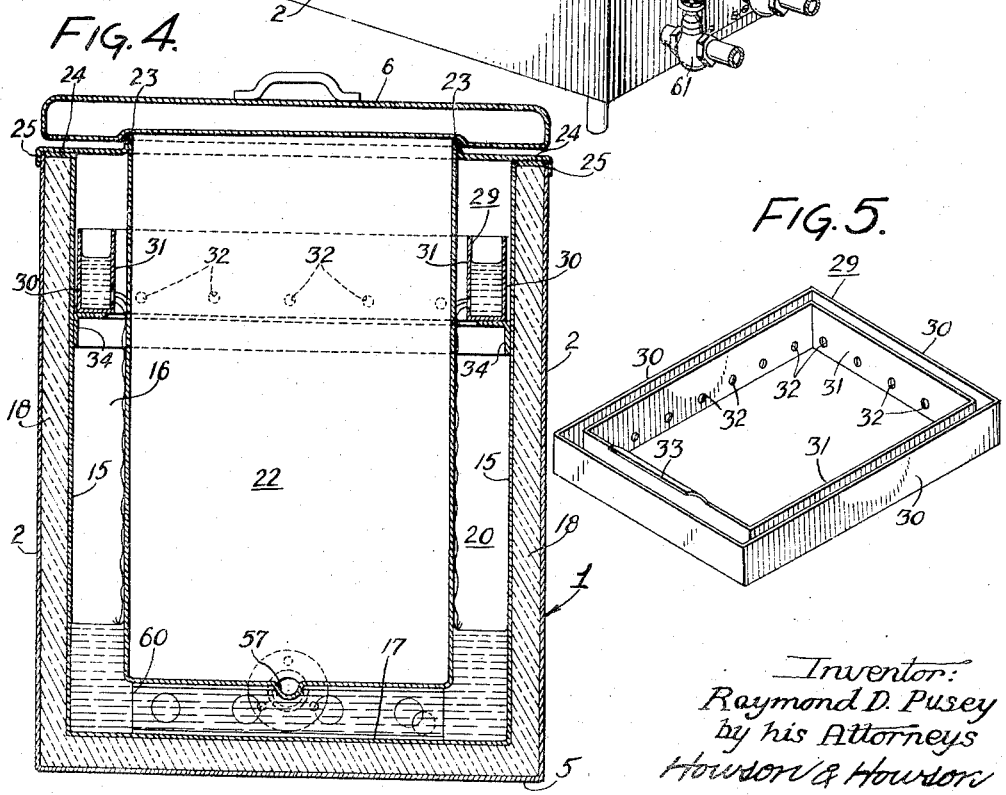
Inventor:
Raymond D. Pusey
by his Attorneys
Howson & Howson

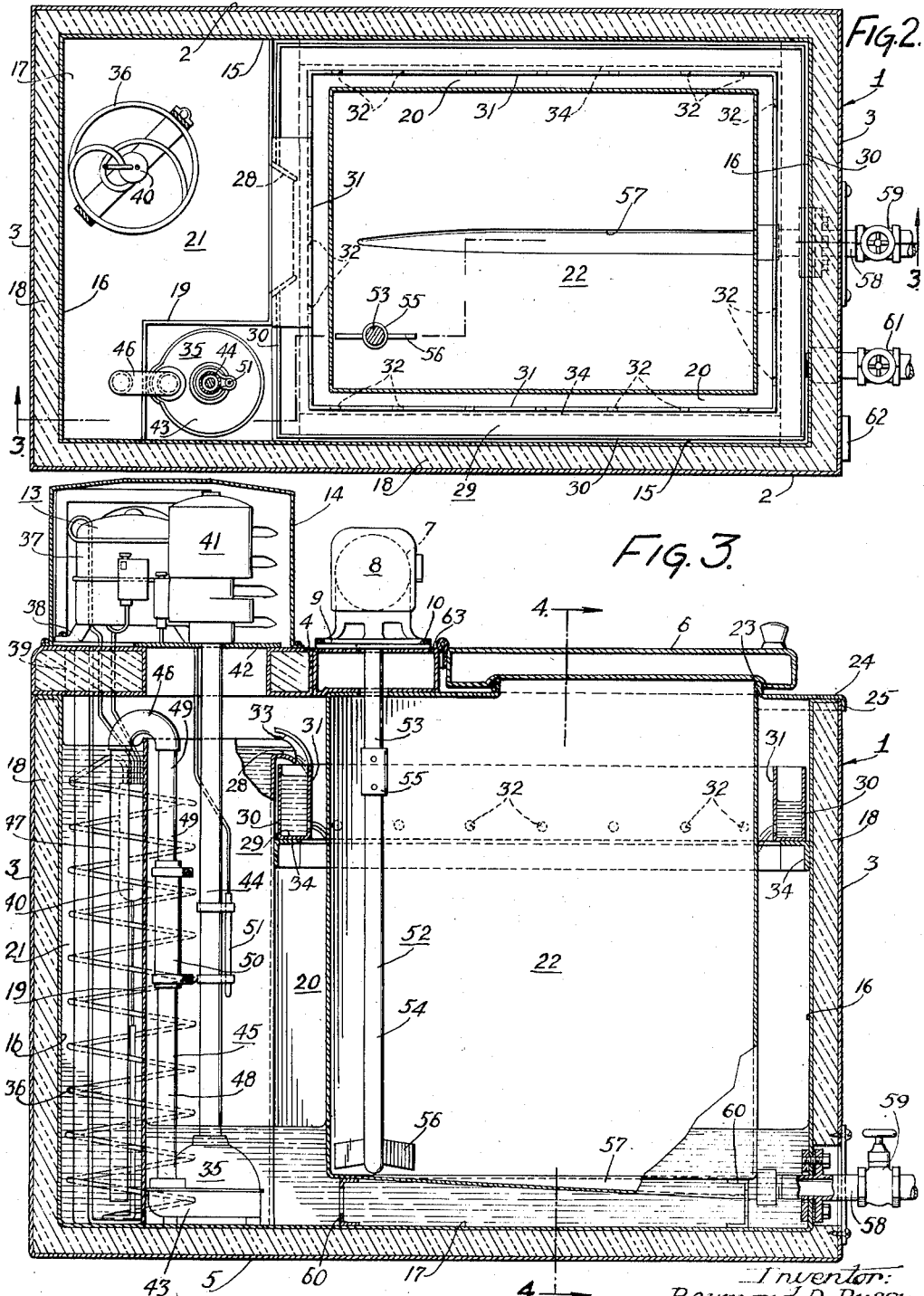

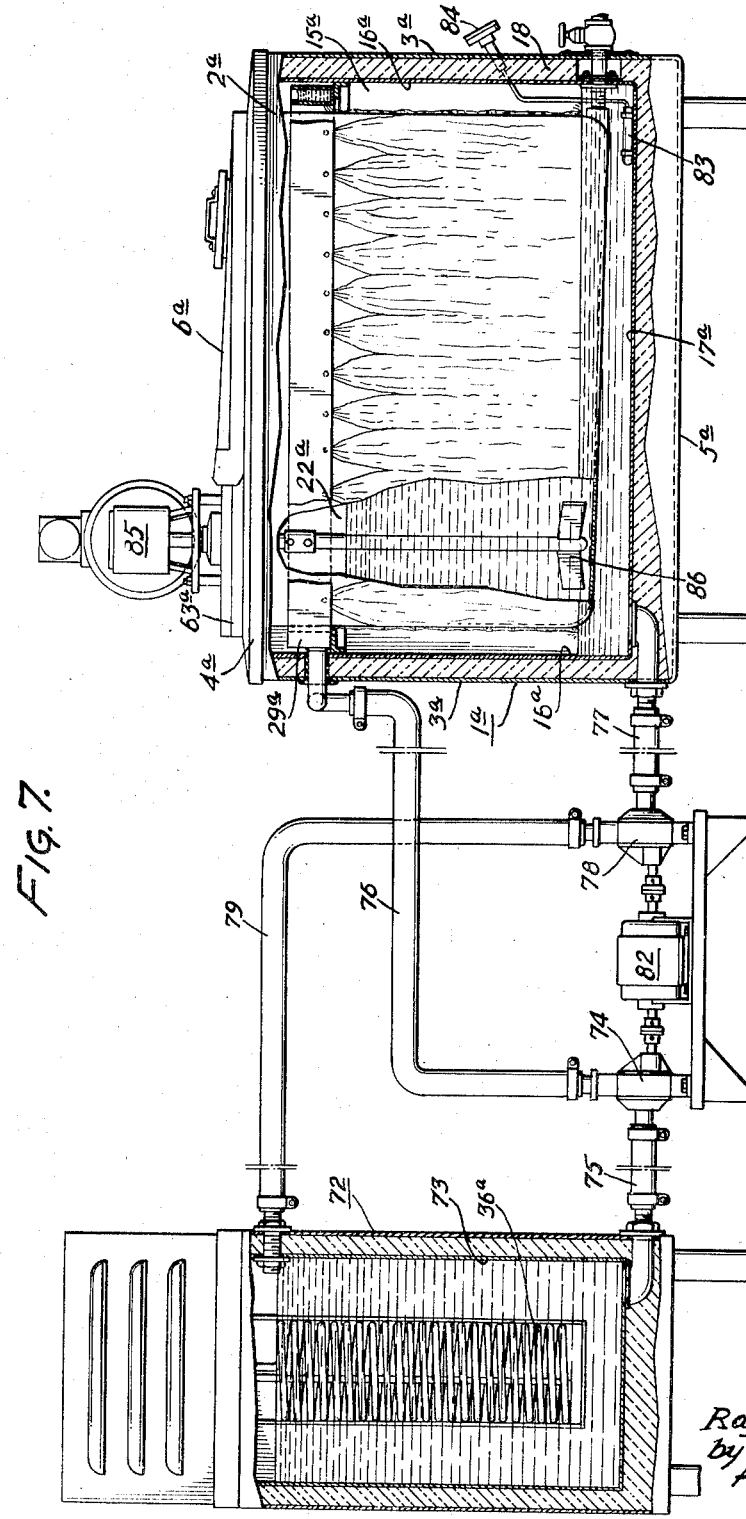

United States Patent Office 2,785,545
Patented Mar. 19, 1957

2,785,545

BULK MILK COOLER

Raymond D. Pusey, Smyrna, Del., assignor to Wilson Refrigeration, Inc., Smyrna, Del., a corporation of Delaware Application September 24, 1954, Serial No. 458,240

2 Claims. (Cl. 62—141)

This invention relates to milk coolers and the principal object of the invention is to provide a cooler of the bulk type having generally improved structural form and functional characteristics. This application is a continuation-in-part of my application Serial Number 341,649, filed March 11, 1953, entitled "Bulk Milk Cooler," now abandoned.

A more specific object of the invention is to provide a milk cooler wherein milk can be cooled in bulk form and the necessity for handling individual milk cans is eliminated.

A further object of the invention is to provide a milk cooler of the secondary heat exchange type comprising the conventional cabinet, a suitable primary cooling means, a suitable liquid secondary heat exchange medium, circulation and distribution means for said secondary heat exchange medium and a container constructed and arranged in spaced relation to the inner walls of the said cabinet so that the secondary heat exchange medium impinges upon the outer surfaces of said container, thus effecting cooling of the milk container therein in bulk form.

Another object of the invention is to provide a milk cooler of the stated type wherein the means for circulating the secondary medium takes the form of a self-contained pump unit installed in the cabinet by way of an opening in the top wall thereof and supported in the latter in a manner affording ready removal of the unit by a simple lifting operation for repair, cleaning or replacement.

Another object of the invention is to provide a milk cooler of the bulk type wherein the primary cooling means takes the form of a self-contained refrigeration unit which is installed in the cooler assembly by way of an opening in the top wall in the cabinet, said unit being supported on the said top wall and being readily detachable by a simple lifting operation from the cabinet for repair, cleaning or replacement.

Another object of the invention is to provide a milk cooler of the stated type wherein a milk agitator assembly is arranged on the top wall of the cabinet and has an impeller mounted on a shaft, said shaft being insertable in said tank through an aperture in said top wall, and said assembly being readily detachable from said cabinet for cleaning, and other purposes.

Another object of the invention is to provide a milk cooler of the stated type wherein the secondary heat exchange medium flows through a spray means mounted in the space between the walls of the milk tank and the inner walls of the cabinet and is sprayed by hydraulic pressure through a plurality of apertures in the side walls of said spray means so that simultaneous contact is made with all exterior surfaces of the tank and thus uniform cooling is effected.

A still further object of the invention is to provide a milk cooler wherein temperature controls for the secondary heat exchange medium and for the primary cooling means are associated as integral parts thereof with the cooling and circulating units respectively.

A broader object is to provide a milk cooler having separate control means for the secondary heat exchange medium and the primary cooling means said control means operating cooperatively to maintain substantially constant temperatures in the said medium and in the compartment.

A further object of the invention is to provide a bulk milk cooler of the secondary heat exchange type comprising two separate cabinets, in one of which is housed the heat exchanger for the primary and secondary systems, and the other of which contains the bulk container and distribution system for the secondary refrigerant. The latter cabinet may comprise an existing can-type cabinet to which has been added a suitable bulk container. By this arrangement the necessity for total replacement of existing units is avoided and because of the increased capacity of the bulk container for a particular floor area, greater quantities of milk may be cooled.

The invention contemplates also provision in the cabinet of a large vertical reservoir in which the evaporator of the primary cooling means is housed for intimate contact with the secondary heat exchange means, said reservoir affording a large volume of refrigerated liquid adequately to cool the milk in the container.

The invention resides further in certain structural details hereinafter described and illustrated in the attached drawings wherein:

Fig. 1 is a view in perspective of a milk cooler made in accordance with the invention;

Fig. 2 is a horizontal sectional view on the line 2—2 of Fig. 1;

Fig. 3 is a vertical sectional view on line 3—3 of Fig. 2;

Fig. 4 is a vertical sectional view taken on line 4—4 of Fig. 3;

Fig. 5 is a view in perspective of the spray pan used in the cabinet of Fig. 1;

Fig. 6 is a view in perspective of a modified form of spray means that may be used in the cabinet of Fig. 1; and Fig. 7 is an elevational view partly in section of a modified form of milk cooler.

With reference to the drawings the preferred form of milk cooler therein illustrated comprises a rectangular cabinet 1 having side walls 2, end walls 3, a top panel 4, a bridge 63 and a bottom wall 5. A lid 6 provides cover for the milk tank and is hinged to the bridge 63. On the bridge 63 is mounted a milk agitator assembly comprising a motor 7 and a reduction gear 8 mounted in turn on a common base 9 which is secured to the bridge 63 by suitable securing means 10. The milk agitator assembly has an impeller dependent from the common base 9 and extending into the milk storage container as will be hereinafter described. As best shown in Figs. 2 and 3 a removable refrigeration unit, indicated generally by reference character 13, is mounted on the top wall 4 of the cabinet in operative relation thereto and has a suitable ported shroud 14 to protect the unit from foreign matter.

The inside of the cabinet is provided with side walls 15, end walls 16 and a bottom wall 17 all in spaced relation to the corresponding outer walls 2, 3, and 5. Suitable insulation 18 is interposed between said inner and outer walls. An upstanding partition 19 divides the interior of the cabinet into a major compartment 20 and a minor compartment 21. Partition 19 has an offset portion at one end thereof to accommodate a circulation pump as will be hereinafter described.

A milk storage container 22 is mounted within the compartment 20 in spaced relation to the inner walls of the latter, this container being designed to receive the bulk milk to be cooled; and a minor compartment 21 constitutes a reservoir for the water or other cooling medium which after being refrigerated in the reservoir compartment is distributed over the side surfaces of the container 22 in a manner hereinafter described. As best shown in Figs. 3 and 4 the container 22 has a flange portion 23 at the top thereof and panel portions 24 extending normally thereto and terminating in downwardly extending flanges 25 which are constructed and arranged so as to embrace the up marginal edges of the exterior walls of the cabinet.

It will be noted that the minor compartment 21 normally contains sufficient secondary heat exchange medium so that the medium overflows through a weir 28 integral with the top of the partition 19 and flows into a spray pan 29 which is of rectangular section having outer walls 30, inner walls 31 in which apertures 32 are arranged to permit the flow of refrigerating medium therethrough, and a deflector 33 integral with one of the inner walls 31 of the spray pan 29 to prevent splashing of the refrigerating medium as it flows over weir 28. The spray pan 29 is mounted in the cabinet on support members 34 so that the deflector 33 cooperates with the weir 28 as shown in Fig. 3. The refrigerating medium flows through apertures 32, impinges upon the sides of the container 22 and flows down said sides to the bottom of the major container 20 forming a pool. The refrigerating medium is then transferred by a pump generally indicated by reference numeral 35 to the compartment 21 in a manner hereinafter described.

Mounted on the top wall 4 of the cabinet above the reservoir chamber 21 is refrigerating unit 13 which comprises a dependent cooling coil 36, a hermetically sealed compressor unit 37, having associated therewith the conventional condenser and fan. These elements are mounted on a base 38 which seats upon the top of the cabinet over an opening 39 through which the cooling coil 36 extends into the chamber 21, the base 38 forming a cover for the opening 39. Preferably the unit 13 is controlled automatically by a thermostat 40 which is responsive to the temperature of the secondary medium immediately adjacent to the cooling coils 36. In this way the formation of ice on the convolutions of the coil 36 may be accurately regulated and minimized.

This construction provides a complete self-contained drop-in hermetically sealed refrigerating unit having the conventional condenser and fan, which is readily installed simply by dropping the coil 36 through the opening provided in the top of the cabinet. This feature permits the self-contained refrigerating unit to be easily removed from the cabinet merely by lifting the base 38 upwardly till the coil is freed from the chamber 21 thereby rendering it accessible for cleaning, service or replacement.

The pump 35 is driven by a motor 41 which is mounted above motor base 42 and is operatively connected with a suitable impeller mounted in a casing 43 at the lower end of a tubular housing 44 dependent from the underside of the base 42. The discharge port of the casing 43 is connected to the lower end of an upright duct 45 which extends in spaced parallel relation with the tubular housing 44 and is provided at its upper end with a U fitting 46 which is connected to a downwardly extending duct 47 which carries warm refrigerating medium to the bottom of the reservoir chamber 21 so that the warm medium may flow upwardly adjacent the coils 36 with resulting maximum heat exchange. The upright duct 45 includes two separate pipe sections 48 and 49 respectively which are connected by a flexible tube 50, thus affording adjustment of the length of the duct 45 as may be required.

The operation of the pump motor 41 is controlled automatically by a thermostat 51 which is responsive to the temperature in the major compartment 20 so that the circulation of water is effected as required to maintain the desired milk cooling and storage temperature in said major compartment.

As best seen in Fig. 3 the milk agitator assembly has a shaft 52 extending from the reduction gear 8 through an aperture in the bridge of the cabinet and down into the container 22. The shaft 52 comprises separate sections 53 and 54 joined by a detachable coupling member 55, the lower end of the section 54 having an impeller 56 mounted thereon to keep the milk in agitation so that uniform cooling is effected and so that proper samples may be taken. It will be apparent that the section 54 together with the impeller 56 may be removed for cleaning, or to permit the removal of the remainder of the milk agitator assembly.

As will be seen in Fig. 3 the container 22 has a longitudinally extending trough 57, which trough is connected to pipe 58 to permit withdrawal of milk from the container 22. A suitable valve 59 may be provided on pipe 58. It will be noted that supports 60 are provided in the compartment 20 to maintain the container 22 and the wall 17 in spaced relation. A valve 61 is provided to drain the interior of the compartment 20, if such be desired. As will be seen in Fig. 1 a thermometer 62 is mounted on one of the exterior walls 3 to afford indication of the temperature prevailing in the container 22.

Fig. 6 shows a modified form of the spray means disclosed in Fig. 5. This form of the invention comprises a pan 64 which is positioned adjacent the weir 28, as will be apparent, and a plurality of tubular portions 65, 66, and 67 having apertures 68 therein to permit the efflux of secondary heat exchange medium onto the side walls of the container 22.

In Fig. 7 I have shown an arrangement in which two separate cabinets are utilized in one of which is housed the heat exchanger for the primary and secondary systems and the other of which contains the bulk tank and distribution system for the secondary refrigerant. The cabinet 1a may comprise the cabinet of a can-type cooler of the old top-opening type. This cabinet is similar to the cabinet of the preferred form of the invention but differs therefrom in that the milk storage container 22a extends substantially throughout the entire interior of the cabinet. This arrangement permits the cooling and storage of a greater quantity of milk for a particular floor area. The cabinet 1a has side walls 2a, end walls 3a, a top panel 4a, a bridge 63a, and a wall 5a. A lid 6a is hinged to the bridge 63a and affords access to the interior of the container 22a for filling, cleaning, etc. A liner comprising side walls 15a, end walls 16a, and a bottom wall 17a is arranged in spaced relation to the outer walls 2a, 3a and 5a. Suitable insulation 18a is interposed between said inner and outer walls. A milk agitator assembly indicated generally by reference numeral 85 is mounted on the top wall 4a of the cabinet 1a and has an impeller 86 depending into the container 22a to afford turbulence and consequent conduction of heat from all of the milk in the container 22a to the secondary refrigerant flowing down the exterior surfaces of the container. The secondary refrigerant in this instance is cooled in the cabinet 72 by the cooling coil 36a of the primary refrigerant unit similar to that employed in the form of the invention shown in Figs. 1 to 6. This heat exchange cabinet may be arranged remotely from the first cabinet and may even be installed exteriorly of the milk house. The cabinet 72 has an inner wall or liner 73 comprising side and end walls and a bottom wall arranged in spaced relation to the corresponding outer walls thereof forming a reservoir for the secondary medium.

The secondary refrigerant is withdrawn from the cabinet 72 by means of the pump 74 through the conduit 75 and is forced through the conduit 76 into the spray pan 29a from which it is dispensed as in the preferred form of the invention. The warmed refrigerant collects in the bottom of the cabinet 1a from whence it is drawn through the conduit 77 by the pump 78 and transmitted through the conduit 79 back to the cabinet 72. A common actuating member which preferably takes the form of an electric motor 82 drives both the pump 74 and the pump 78. The temperature of the secondary medium in the bottom of the cabinet 1a is indicated, by means of a thermostat 83, on an indicator dial 84.

The general mode of operation will be apparent from the foregoing description which discloses a milk cooler of the bulk type, the control of which is effected by a plurality of thermostats in a manner to afford uniform cooling of bulk milk. The cooler exhibits simplicity of form, practicality and efficiency, the assembly of the functional elements in the cabinet being effected with the minimum of complication and the said elements being readily accessible for cleaning, adjustment, repair or replacement. The relatively large capacity of the chamber 21 with respect to the storage capacity of the chamber 20 insures adequate supply of refrigerated water for continuous distribution over the walls of the chamber.

The above described modified form of milk cooler is capable of effecting a substantial saving in floor space since the second cabinet may be located at any place remote to the cabinet 1a where space may be available, leaving additional space in the milk house available for a bulk milk tank of increased capacity. Of greater importance is the fact that the arrangement provides for conversions of existing can-type units at relatively little cost and avoids the necessity for total replacement of the existing units.

I claim:

1. In a milk cooler, the combination comprising a compartment, a bulk milk container housed in said compartment closely spaced within the walls thereof and having an opening in its top for reception of milk through the top of said compartment, a second compartment comprising a liquid reservoir adapted to receive and cool a body of refrigerant liquid, said second compartment having an opening at the top thereof, a self-contained refrigerating unit mounted detachably on said second compartment and including a cooling element depending into said reservoir, conduit means for delivering cooled liquid by gravity from said second compartment into the space between the inner walls of said first compartment and the milk container and against the walls of said container, a conduit having its receiving end within the liquid-containing space of said first compartment and its delivery end adjacent the bottom of said second compartment, and a pump for impelling coolant liquid through said conduit, whereby cyclically to cool said coolant liquid, and through said liquid to cool the milk within said container.

2. A milk cooler according to claim 1, in which said conduit means includes a pan into which coolant liquid is delivered from said reservoir.

References Cited in the file of this patent
UNITED STATES PATENTS

| | | |
|---|---|---|
| 2,203,439 | Oliver | June 4, 1940 |
| 2,380,901 | Chamberlain | July 31, 1945 |
| 2,455,162 | Donnelly | Nov. 30, 1948 |
| 2,459,337 | Raney | Jan. 18, 1949 |
| 2,508,289 | Peck | May 16, 1950 |
| 2,608,836 | Pusey | Sept. 2, 1952 |
| 2,618,127 | Shipman | Nov. 18, 1952 |
| 2,680,356 | Wallenbrock | Jan. 28, 1954 |
| 2,690,061 | Markley | Sept. 28, 1954 |
| 2,691,282 | Snelson | Oct. 12, 1954 |
| 2,700,281 | Bakke | Jan. 25, 1955 |